(12) United States Patent
Aldaz et al.

(10) Patent No.: US 6,754,503 B1
(45) Date of Patent: Jun. 22, 2004

(54) METHOD FOR ADAPTIVELY SELECTING A SOFT SYMBOL FOR A SUBSEQUENT OPERATION A COMMUNICATION DEVICE

(75) Inventors: Luis Aldaz, San Jose, CA (US); Daniel Jeng Hsia, Del Mar, CA (US)

(73) Assignees: Koninklijke Philips Electronics, Eindhoven (NL); Texas Instruments Inc., Dallas, TX (US)

( * ) Notice: Subject to any disclaimer, the term of this patent is extended or adjusted under 35 U.S.C. 154(b) by 411 days.

(21) Appl. No.: 09/677,938

(22) Filed: Oct. 2, 2000

(51) Int. Cl.[7] .................. H04B 15/00; H04B 7/005; H04B 7/01; H04B 7/015

(52) U.S. Cl. .................. 455/504; 455/63.1; 455/501; 455/506; 375/346; 375/349; 370/332; 370/334

(58) Field of Search ............................ 455/504, 501, 455/505, 506, 63.1, 65; 370/320, 441, 332, 334, 335, 346; 375/316, 340, 341, 347, 349

(56) References Cited

U.S. PATENT DOCUMENTS

| | | | | |
|---|---|---|---|---|
| 5,325,403 A | * | 6/1994 | Siwiak et al. | 375/347 |
| 5,335,250 A | * | 8/1994 | Dent et al. | 375/224 |
| 5,446,763 A | * | 8/1995 | Baum et al. | 375/340 |
| 5,490,165 A | | 2/1996 | Blakeney, II et al. | 375/205 |
| 5,493,584 A | * | 2/1996 | Emeott | 375/224 |
| 5,542,119 A | * | 7/1996 | Grube et al. | 455/503 |
| 5,550,870 A | * | 8/1996 | Blaker et al. | 375/341 |
| 6,185,266 B1 | * | 2/2001 | Kuchi et al. | 375/347 |
| 6,240,099 B1 | * | 5/2001 | Lim et al. | 370/441 |
| 6,347,125 B1 | * | 2/2002 | Dent | 375/341 |

FOREIGN PATENT DOCUMENTS

WO     WO 95/26601     10/1995     ........... H04L/27/22

OTHER PUBLICATIONS

Clark G C et al: "Reliability–of–Decoding Indicators for Maximum Likelihood Decoders" Proceedings of the Annual Hawaii International Conference on System Sciences, Jan. 11, 1972 XP000650870 p. 448, left–hand column, line 1 p. 449, left–hand column, line 20 p. 450, left–hand column, line 3 right–hand column, line 10.

\* cited by examiner

*Primary Examiner*—William Trost
*Assistant Examiner*—Stephen D'Agosta
(74) *Attorney, Agent, or Firm*—Aaron Waxler

(57) ABSTRACT

A method of selecting a soft symbol for a subsequent operation in a communication device is disclosed. In one embodiment, a signal is received at the communication device. Next, the signal is demodulated. Then, a strength level such as a signal to noise ration Eb/Nt is determined. Based upon the strength level determined for the signal, a location of bits of the signal is determined for a subsequent operation. The strength level and the location of bits is adaptively updated for the signal over time.

19 Claims, 8 Drawing Sheets

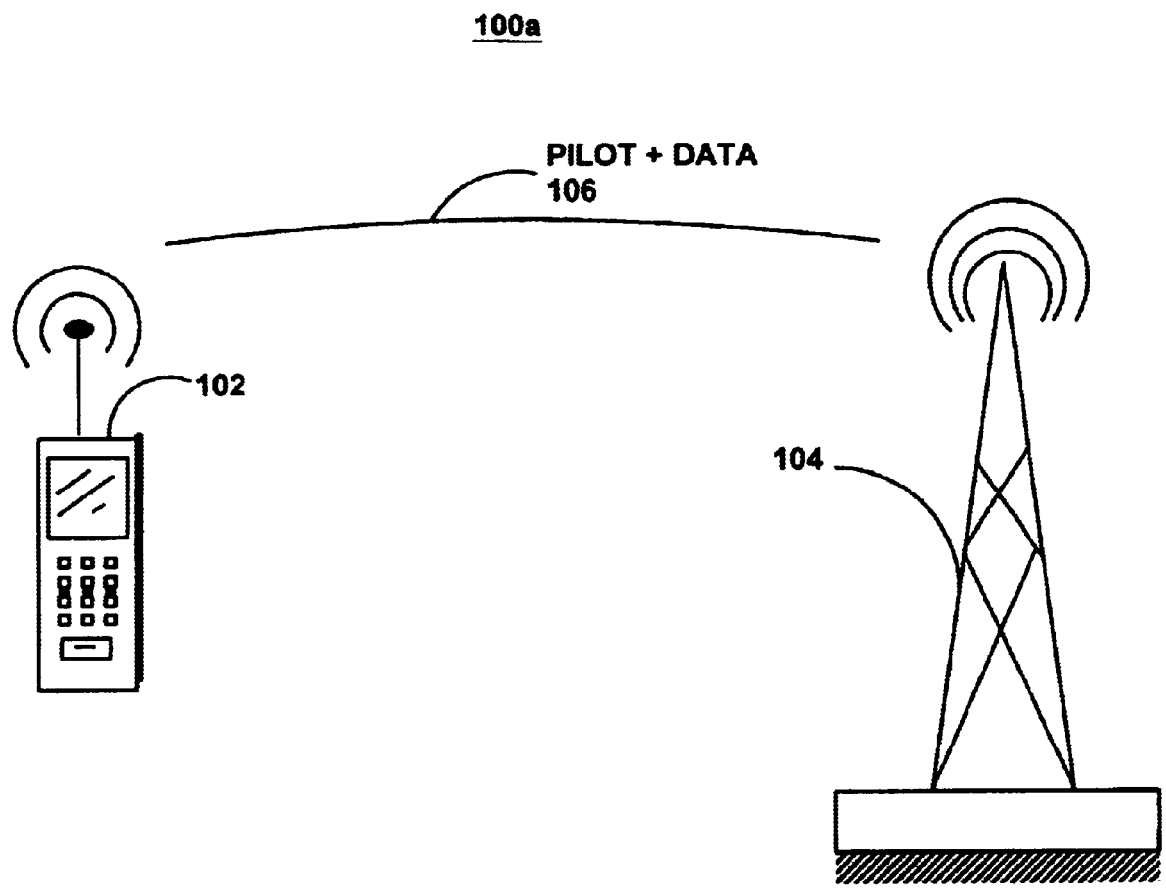
Prior Art FIG. 1

METHOD FOR ADAPTIVELY SELECTING A SOFT SYMBOL FOR A SUBSEQUENT OPERATION A COMMUNICATION DEVICE

TECHNICAL FIELD

The present claimed invention relates to the field of digital communications. Specifically, the present claimed invention relates to an apparatus and a method for adaptively selecting a soft symbol for a subsequent operation, e.g., decoding, within a communication device.

BACKGROUND ART

Wireless communication is expanding to all forms of devices that use information, e.g. cellular phones, a networks, personal digital assistants (PDAs), digital cameras, etc. One form of wireless communication, known as Code Division Multiple Access (CDMA) spread spectrum format, is among the most commonly deployed wireless technology. Because of increasing demand and limited resources, a need arises to improve their fidelity and performance of wireless communication devices and systems.

Referring to prior art FIG. 1, a conventional base station 104, e.g. cell, and a mobile unit 102, e.g. a cell phone, are shown. A CDMA system uses a common bandwidth to transmit the pilot signal and a data signal 106 between a base station 104 and a mobile unit 102, for multiple users. Hence, the bandwidth is occupied by an combination of many signals. Furthermore, the original signal can take multiple paths to arrive at a destination device with various forms of delay and phase shift. These signals from the different paths are referred to as multipath signals. Because the multipath signals can vary substantially in signal strength and other performance factors, a need arises for a method to appropriately evaluate received signals for processing into meaningful data, e.g., voice data.

One conventional configuration identifies only a fixed location, or portion, of bits of the combined signal for subsequent decoding. Often, the fixed location of bits from the combined signal is chosen for its overall performance in many different signal-reception scenarios. Unfortunately, this prior art configuration typically yields only nominal performance in each of the wide-range of reception scenarios. Furthermore, this fixed portion of the combined signal is typically identified in a design phase of the hardware and software, and then programmed into the phone. Hence, a phone may be limited during its entire life to the fixed portion of the combined signal. Consequently, a need arises for a method that overcomes the prior art limitations of selecting a fixed location of bits from the combined signal for decoding.

In summary, a need arises to improve their fidelity and performance of wireless communication devices and systems. Furthermore, a need arises for a method to appropriately evaluate received signals for processing into meaningful data, e.g., voice data. Finally, a need arises for a method that overcomes the prior art limitations associated with selecting a fixed location of bits from the combined signal for decoding.

DISCLOSURE OF THE INVENTION

The present invention provides a method and apparatus for improving the fidelity and performance of digital communication devices and systems. In particular, the present invention provides a method to appropriately evaluate received signals for processing into meaningful data, e.g., voice data. Finally, the present invention provides a method that overcomes the prior art limitations associated with selecting a fixed location of bits from the combined signal for a subsequent operation.

Specifically, one embodiment of the present invention provides a method of adaptively selecting a soft symbol for a subsequent operation in a communication device is disclosed. In one embodiment, a signal is received at the communication device. Next, the signal is demodulated. Then, a strength level, such as a signal to noise ratio $Eb/Nt$, is determined. Based upon the strength level determined for the signal, a location, or a consecutive sequence, of bits from the signal is determined in the final step for a subsequent operation. The strength level and the location of bits is adaptively updated for the signal over time. It is appreciated that $Eb/Nt$ is the ratio of combined energy per bit to the effective noise power spectral density, which is known by those skilled in the art.

In another embodiment of the present invention, the aforementioned method is implemented in a communication device having a processor, e.g., a general purpose processor, a memory, a rake receiver, and a digital signal processor (DSP). Specifically, the memory portion of the communication device contains data and program instructions that, when executed via the processors, implement the aforementioned method for adaptively selecting a soft symbol from the composite signal for a subsequent operation in the communication device. This bit selection process provides very little head room. This scheme forces higher resolution in the area around the origin, and saturates large signal amplitudes. The process is viable because, at large amplitudes, the signal is unlikely to be decoded incorrectly, and thus does not require much resolution at these signal amplitudes.

These and other objects and advantages of the present invention will become apparent to those of ordinary skill in the art after having read the following detailed description of the preferred embodiments which are illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART FIG. 1 is an illustration of a conventional base station and cell phone.

BEST MODE FOR CARRYING OUT THE INVENTION

Figure 2A:
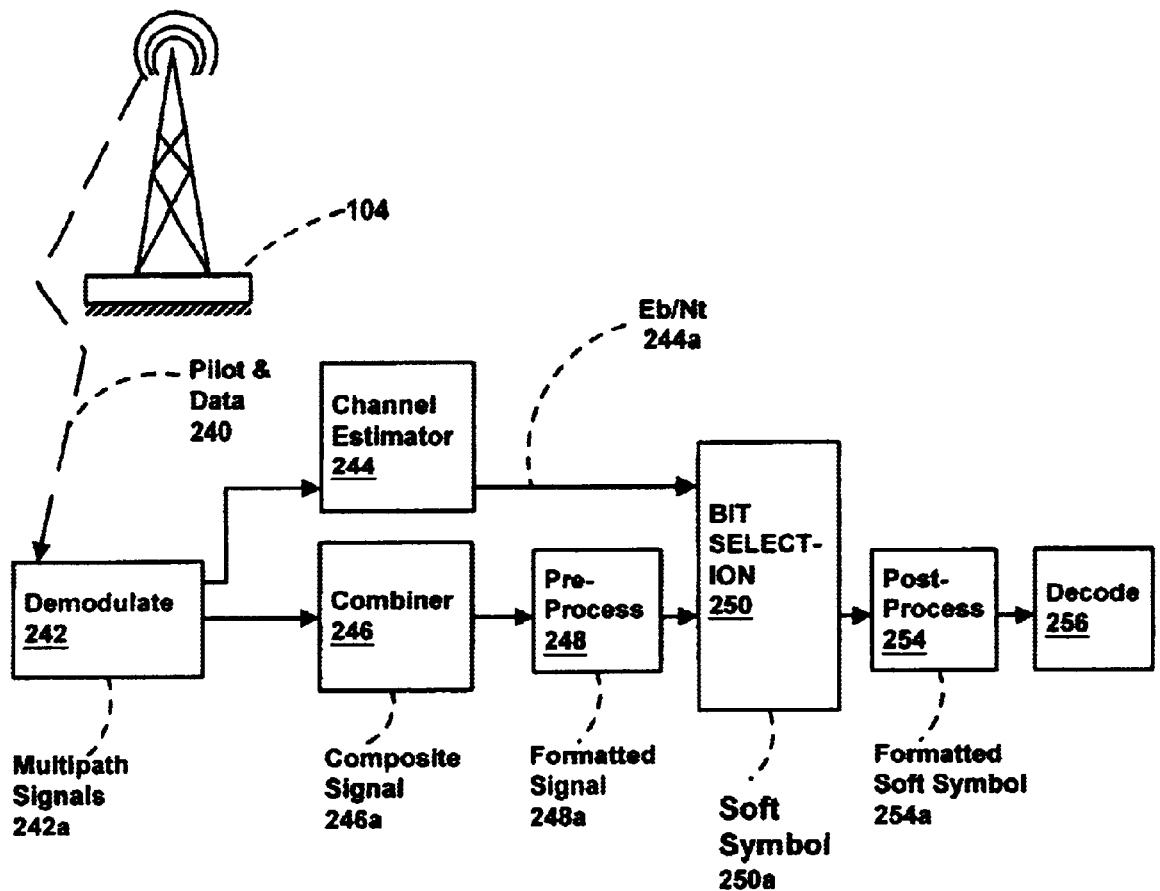
FIG. 2A is a functional block diagram of a bit-selection process, in the context of other communication operations, performed on a signal in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "demodulating," "determining," "choosing," "combining," "multiplying," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

Referring now to FIG. 2A, functional block diagram 200 of a bit-selection process, in the context of other communication operations, performed on a signal is shown, in accordance with one embodiment of the present invention. In the present embodiment, a communication device, such as a base station 104, provides a signal 240, which can include a pilot signal and/or a data signal. Data signal is processed by a communication device, such as a cell phone, whose functions are represented by the function blocks shown in FIG. 2A. However, the functions shown can be implemented by a wide range of communication devices, including base stations, personal computers (PCs), digital cameras, and any other device that has the capability of wireless communication. The present invention is also well suited to the wide range of products being developed for the Blue Tooth specification of wireless communication.

The communication device performs a demodulation function 242 on the signal. In one embodiment, the demodulation function is performed for each of multiple possible multipath signals 242a, if applicable for a given application. The channel estimator function block 244, which is functionally coupled to demodulation block 242, estimates the strength of a signal, e.g., for each of the multipath signals that was demodulated. Channel estimator function 244 can determine a signal strength, such as a signal to strength ratio $Eb/Nt$ which is well-known by those skilled in the art. However, the present invention is well suited to determining any other type of signal strength indicator. Eb refers to the received energy per bit for the desired signal in Watt-seconds, while Nt is the received energy per bit for the noise within the signal.

A combiner function block 246 of FIG. 2A, which is functionally coupled to demodulation block 242, adds the multipath signals to provide a composite signal 246a. Composite signal 246a is a 24 bit 2's complement number in the present embodiment, though the present invention is suitable for using any configuration of signal. Combiner function 246 can be managed by other algorithms and management systems. Co-pending U.S. patent application, serial number 09/679,057, titled "Method and Apparatus for Managing Multipath Signals for a Receiver with Multiple Demodulators" by Gibong Jeong et al., attorney docket number PHA 51263, provides additional details on this subject. This related application is commonly assigned, and is hereby incorporated by reference.

A pre-processor function block 248, which is functionally coupled to combiner block 246, performs a pre-processing function. The pre-processing function prepares composite signal 246a for the bit-selection function block. More detail on pre-processor function block 248 is provided in subsequent FIG. 2C.

Figure 2B:
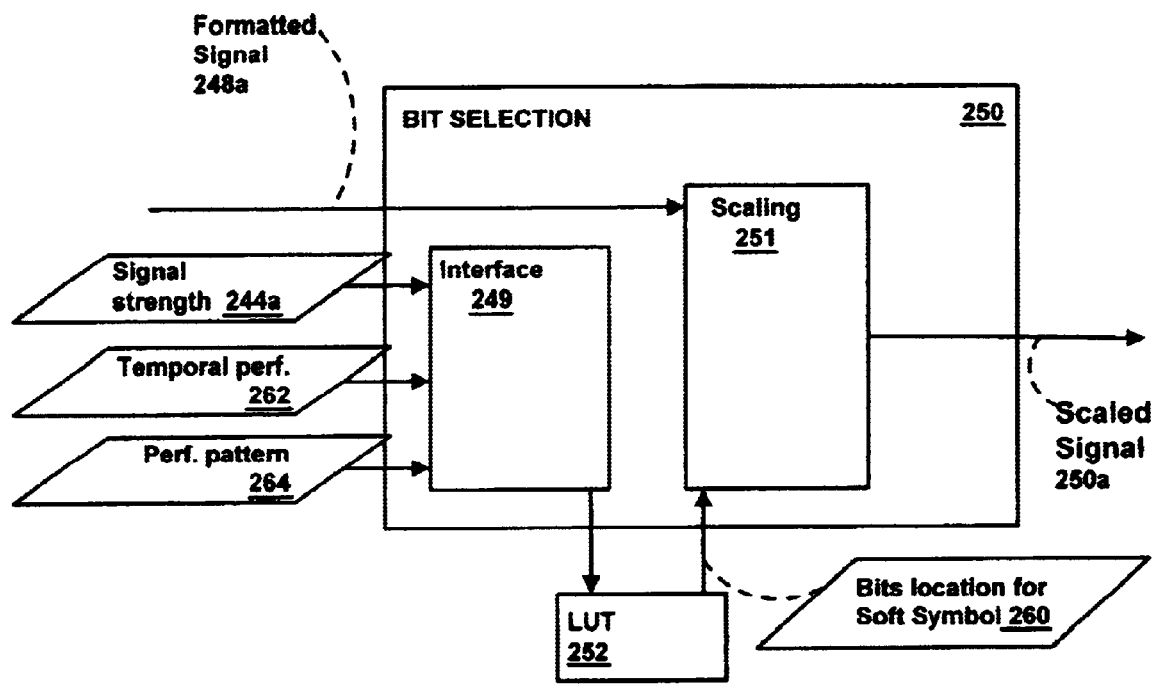
FIG. 2B is a detailed functional block diagram of a bit selection engine, in accordance with one embodiment of the present invention.

A bit selection block 250, which is functionally coupled to pre-processor block 248 and to channel estimator block 244 adaptively selects, or isolates, the appropriate number of bits of a signal for a subsequent operation. In one embodiment, bit selection block 250 selects only a six bit portion of the formatted composite signal for a subsequent demodulation operation. This six bit number is commonly referred to as a "soft symbol" 250a. However, the present invention is well suited to choosing any bit-length portion of a signal, as appropriate for a given application. In the present embodiment, the specific six bit portion of a signal chosen at one point in time may be different than the specific six bit portion of the signal chosen at a different point in time, e.g., on the same communication device. Thus, the present invention provides an adaptive bit-selection function. This feature overcomes the limitation associated with the prior art, which fixes the soft symbol at a static location of bits within the composite signal. FIG. 2B provides exemplary criteria used to decide which portion of the signal to use.

A post processor function block 254, which is functionally coupled to bit selection block 250, performs a post-processing function. Post-processing function 254 prepares a soft symbol signal 250a for the demodulation function. More detail on post-processor function block 254 is provided in subsequent FIG. 2D.

A decode function block 256, which is functionally coupled to post processor block 254, performs a decoding function. Decoding function 256 can be performed using any of several methods that are well-known to those skilled in the art. One such decoder is a Viterbi decoder, used in code division multiple access (CDMA) systems. While the present invention adaptively provides a soft symbol to a decoding operation, the present invention is well suited to providing a soft symbol, or some other bit sequence, for some other type of operation within the communication device.

Figure 4:
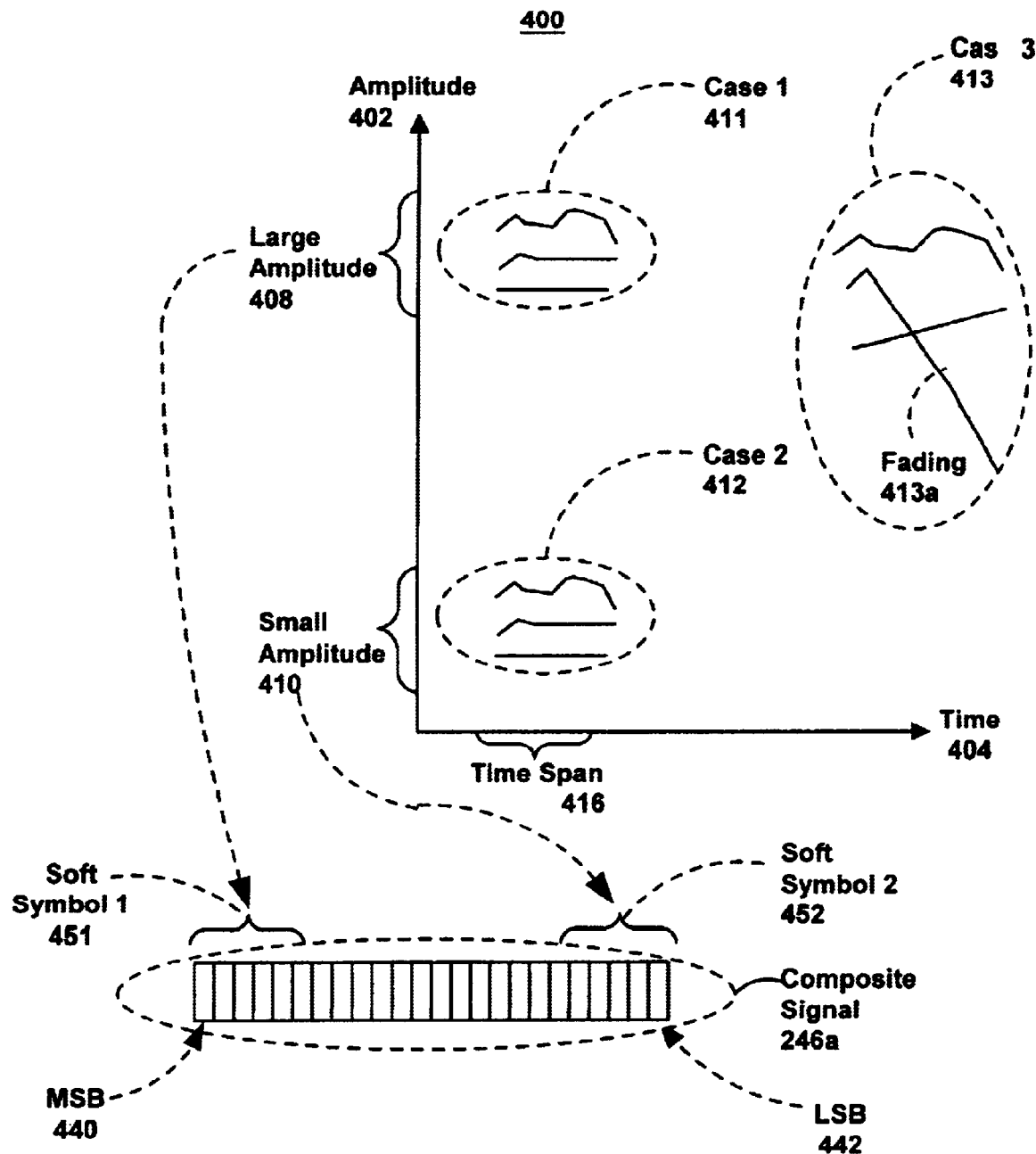
FIG. 4 is a graph of several exemplary cases of signal performances, and their corresponding influence on bits of the combined signal, in accordance with one embodiment of the present invention.

Referring now to FIG. 2B, a detailed functional block diagram of a bit selection function block, or engine is shown, in accordance with one embodiment of the present invention. Bit selection engine 250 receives a number of criteria at an interface 249. These criteria will be used to decide which bits of a signal to select for subsequent processing, e.g., decoding. In one embodiment, the criteria includes signal strength criteria 260, temporal performance 262, and performance pattern 264. Subsequent FIG. 4 provides examples as to the effect these criteria may have on the bit selection process. However, the present invention is well suited to using any combination of these criteria, or to using other types of criteria that would allow it to adaptively select a desired number of bits from a signal for any one of multiple subsequent operations.

Interface 249 which matches the appropriate values and categories in a look up table (LUT) 252, then provides the corresponding bit location value to a scaling function block 251. The bit location value 260 can have a number of different configurations, depending upon the application. For example, bit location value 260 can be a scaling value that, when multiplied by the composite signal 248a via scaling block 251, isolates the appropriate bit range, e.g., multiply a signal by a value of less than one to reduce the size, or number of bits, of the composite number. Alternatively, the bit location value 260 can be an offset value which indicates the number of bits to be dropped from the LSB portion of the composite signal.

While the present embodiment in FIG. 2B utilizes a LUT, any type or method of corresponding data can be used, e.g., flags, etc. Furthermore, the present invention is well suited to employing a prioritization scheme amongst the multiple criteria used for the bit-selection function. That is, one of the criteria may be given more weight than other factors, e.g., if it has a greater influence on the effects of the signal in a subsequent operation such as the decoder.

Figure 2C:
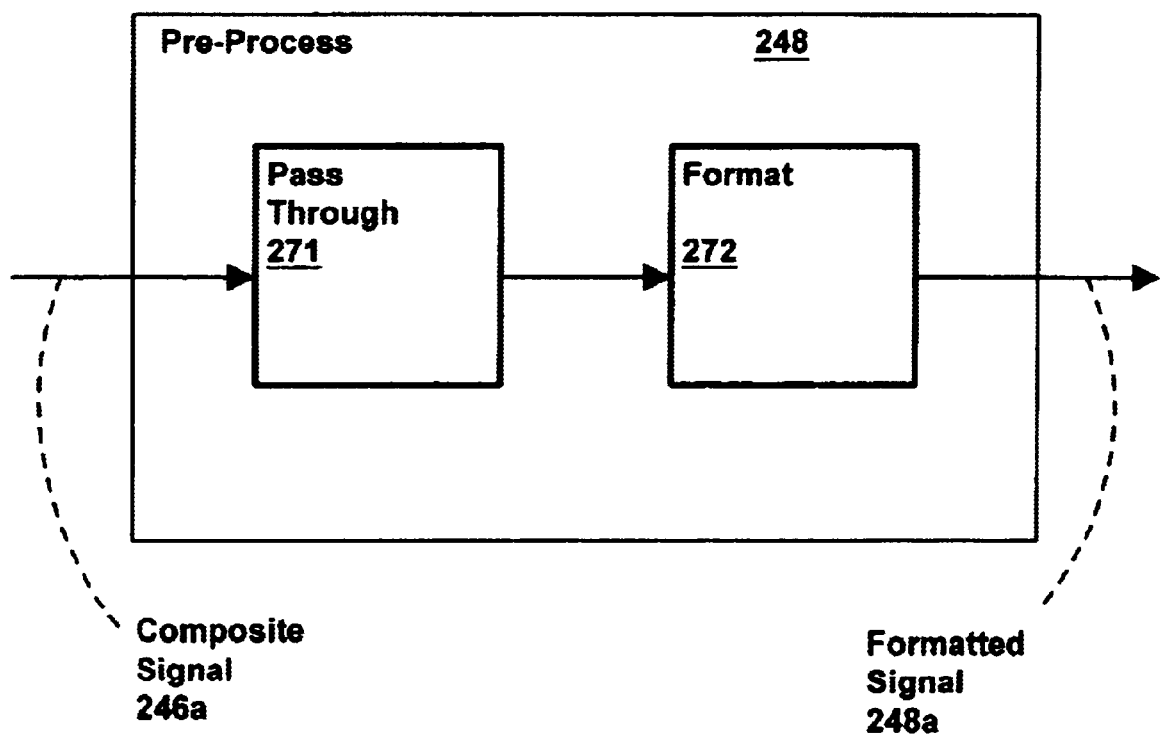
FIG. 2C is a detailed functional block diagram of a pre-processing function, in accordance with one embodiment of the present invention.

Referring now to FIG. 2C, a detailed functional block diagram of a pre-processing function block is shown, in accordance with one embodiment of the present invention. Pre-processing can include a wide variety of sub-functions. For example, in one embodiment, composite signal 246a is processed through the following sub-functions: a) pass-through filter function 271; and b) format function 272. However, pre-processor function block 248 can be configured to provide more or fewer sub-functions, as appropriate for a given application. The format function, in the present embodiment, drops 1 or more of the least significant bits (LSB). In the present embodiment, the eight LSBs of the 24 bit composite signal are dropped. Furthermore, in another embodiment, no pre-processor function is used. The pre-processor function block 248 thus provides a formatted signal 248a.

Figure 2D:
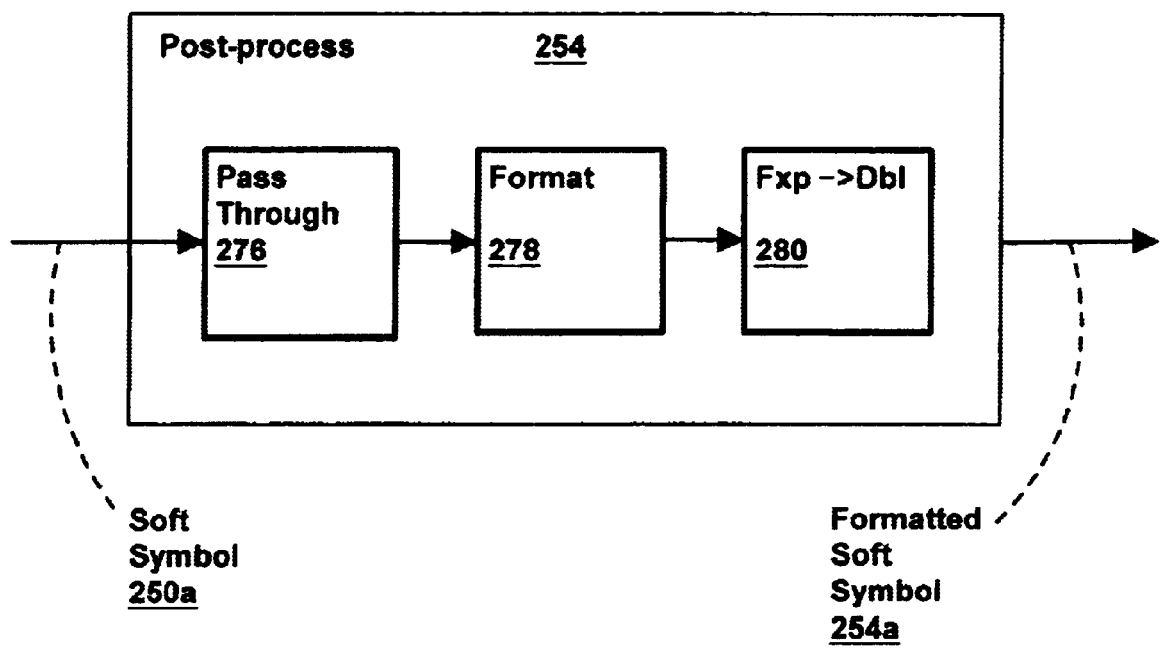
FIG. 2D is a detailed functional block diagram of a post-processing function, in accordance with one embodiment of the present invention.

Referring now to FIG. 2D, a detailed functional block diagram of a post-processing function block is shown, in accordance with one embodiment of the present invention. Post-processing can include a wide variety of sub-functions. For example, in one embodiment, soft symbol signal 250a is processed through the following sub-functions: a) pass-through filter function 276; b) format function 278; c) fixed point to double point conversion 280, (a.k.a. deinterleaver, depuncture, derepeat, and round up to a six-bit number); and d) z-transform (a.k.a. a delay operator) 282. The format function, in the present embodiment, drops the non-integer portion of the signal, thus providing a whole number portion of the signal.

While the represent embodiment provides a specific quantity and type of subfunctions, the post-processor function block 254 can be configured to provide a different quantity or type of sub-functions, as appropriate for a given application. Furthermore, in another embodiment, no post-processor function is used. Post-processor function block 250 thus provides a formatted soft symbol 254a. This bit selection process provides very little head room. Furthermore, it saturates large signal amplitudes. The process is viable because, at large amplitudes, the signal is unlikely to be decoded incorrectly, and thus does not require much resolution at these signal amplitudes. This scheme forces higher resolution in the area around the origin, and saturates; large signal amplitudes.

Figure 3:
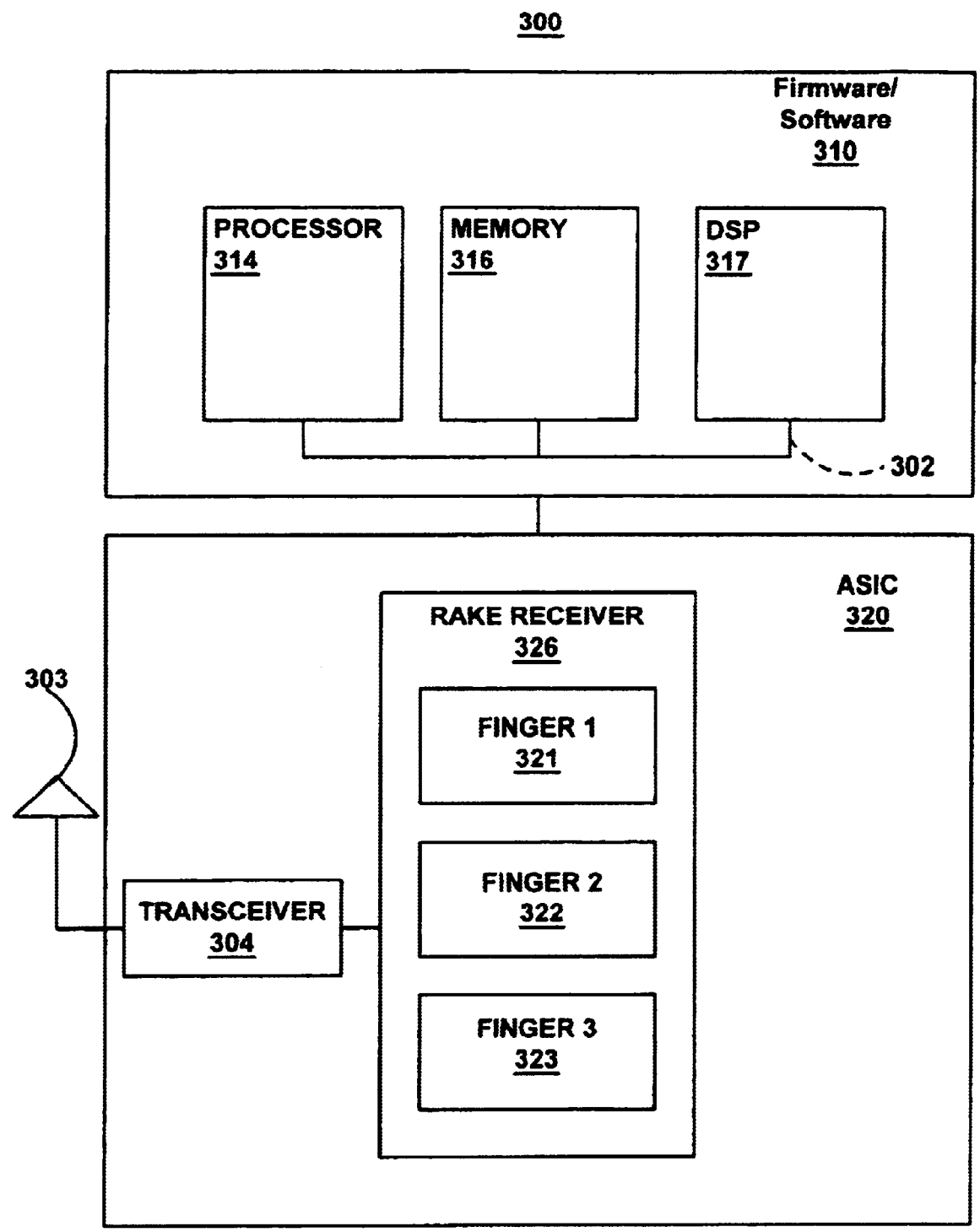
FIG. 3 is a hardware block diagram of a communication device used for the bit-selection process, in accordance with one embodiment of the present invention.

Referring now to FIG. 3, a hardware block diagram of a communication device used for the bit-selection process is shown, in accordance with one embodiment of the present invention. Communication device 300 of FIG. 3 can be a stand alone unit, such as a cellular phone. However, it may also be a component of a larger device, such as a printer, computer, cameras, personal digital assistant (PDA), etc. It is appreciated that the present invention is applicable to any device capable of processing wireless data of the appropriate configuration.

Communication device 300c includes a firmware/software block 310 and an application specific integrated circuit (ASIC) block 320, coupled to each other. ASIC block 320 includes an antennae 303, a transceiver 304, and a rake receiver 326. Antennae 303 is coupled to transceiver 304 which in turn is coupled to rake receiver 326. Rake receiver 326, in the present embodiment, includes three separate fingers, finger 1 321, finger 2 322, and finger 3 323. Each finger demodulates an individually assigned multipath signal.

Firmware/software block 310 includes a processor 314 (e.g., a general purpose processor), memory 316, and a digital signal processor (DSP) 317, coupled to each other via bus 302. Data and/or program instructions can be stored in memory 316 and implemented via processor 314 or DSP 317, in concern with other components of communication device 300, including those not shown that are well-known in the art. Memory 316 of the present embodiment can include both permanent memory, such as read only memory (ROM), and temporary memory such as random access memory (RAM). ROM memory can be utilized to store data for permanent functions of the dedicated service module, while RAM memory can be utilized to store data related to the on-site media service data. Memory 316 can include other types of memory storage, capable of containing data, such as a hard drive, a CD ROM, or flash memory. In lieu of using memory to store instructions, a state machine can be designed to perform the desired instructions.

While the present embodiment shows three fingers, the present invention is well-suited to using any number of fingers in a rake receiver. Additionally, the present invention can include more or less components than those shown in the present embodiment of communication device 300. Communication device 300 can be used to implement the functions blocks of FIGS. 2A and 2B. For example, in one embodiment, the demodulator function 242 can be accomplished by transceiver 304 and rake receiver 326 portions of ASIC 320. Alternatively, the demodulation function can be accomplished by the firmware/software portion 310 of communication device. In another example, pre-process function 248, bit selection function 250, and post-process function 254 are implemented via firmware/software 310 portion of communication device 300. However, they can also be implemented in an ASIC design.

Referring now to FIG. 4, a graph of several exemplary cases of signal performances, and their corresponding influence on bits of the combined signal is shown, in accordance with one embodiment of the present invention. Graph 400 will be described first, then composite signal 246a will be discussed, and finally, the interaction between these two entities will be described.

Graph 400 has an ordinate of signal amplitude 402 and an abscissa of time 404. Signal amplitude can represent signal power, or signal power to noise ratio, such as Eb/Nt. Three cases of signal performances are shown in FIG. 4. Each case has three separate multipath signals, e.g., one signal for each of three finger demodulators as shown in FIG. 3. Case 1 411 of FIG. 4 is a grouping of three signals, all having a large amplitude 408. This indicates a strong, direct path of signal from one communication device to another. Case 2 412 is a grouping of three signals, all having a small amplitude 410. This is an indication of a weak signal or an extended distance between communication devices. Lastly, case 3 413 is a grouping of three signals, two of them at a large amplitude 408 and one fading signal 413a that is degrading from a large amplitude 408 to a small amplitude over a period of time.

Composite signal 246a is a digital binary number that represents the strength of the added multipath signals. In the present embodiment, composite signal is comprised of twenty-four (24) bits, though signal may have any length of bits. The most significant bit (MSB) is located on the far left of the string of digits. Conversely, the least significant bit (LSB) is located on the far right of the string of digits. The decimal point may be placed anywhere within the string of digits to create a real number. For case 1 411, the large amplitude 408 and the small variation of each signal over time means that most of the changes in the composite signal 246a will be in bits closer to the MSB 440. Hence, soft symbol 1 451 of six bits would be a more appropriate indication of the change in the signal amplitude for case 1 411. And the change in the signal is what provides the meaningful variations in an output signal that, for example, are words or other data. That is, a zero change in a signal is equivalent to a single tone which represents essentially negligible data.

For case 2 412, the small amplitude 410 and small variation of each signal over time means that most of the changes in the composite signal will be in bits closer to the LSB 442. Hence, soft symbol 2 452 of six bits would be a more appropriate indication of the change in the signal amplitude for case 2 412. For case 3 413, the large amplitude performance of two of the signals means that most of the significant changes in the signal will be in bits closer to the MSB 440, but the fading strength of signal 413a may temper the location of the soft symbol slightly in the direction of the LSB 442. The specific choice of the bits can be dependent upon the specific scenario, the specific signal specifications, the specific application, and the specific level of simulation or analysis used to evaluate the scenario. The present invention is well suited to accommodating all these specific situations to provide a wide range of configurations or processes used to adaptively select a portion of bits from a signal for a subsequent operation.

Figure 5:
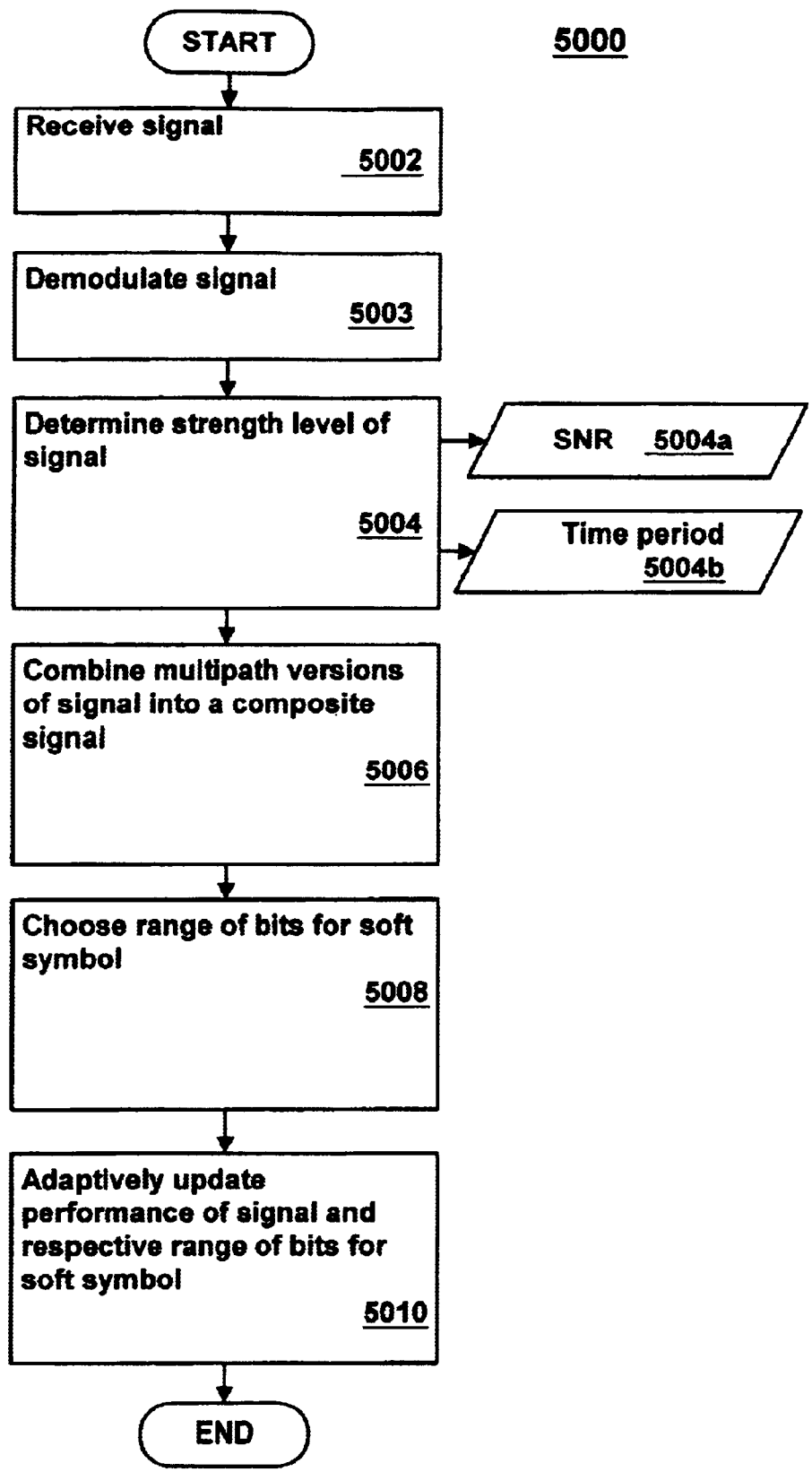
FIG. 5 is a flow diagram of the steps used to implement a method for adaptively selecting a soft symbol for a subsequent operation e.g., a decoding operation, within a communication device, in accordance with one embodiment of the present invention.

FIG. 5 is a flowchart 5000 of the steps used to implement the method for adaptively selecting a soft symbol for a subsequent decoding operation within a communication device, in accordance with one embodiment of the present invention. Flowchart 5000 can be implemented via the functional blocks of FIGS. 2A or 2B and the hardware block diagram of FIG. 3. The result of implementing flowchart 5000 is illustrated by the exemplary signal cases of FIG. 4.

Flowchart 5000 begins with step 5002. In step 5002 of the present embodiment, a signal is received. Step 5002 can be implemented by antennae 303. Alternatively, a signal can be received by any other wireless means such as satellite dish, etc. Following step 5002, flowchart 5000 proceeds to step 5003.

In step 5003 of the present embodiment, the signal is demodulated. Step 5003 is implemented, in one embodiment, using demodulate function block 242 of FIG. 2A or using transceiver 304 and rake receiver 326 of FIG. 3. Demodulation allows the data signal to be captured from the carrier signal. Following step 5003, flowchart 5000 proceeds to step 5004.

In step 5004 of the present embodiment a strength level of the signal is determined. The strength level can be a simple strength level, or a signal to noise ratio 5004a, such as Eb/Nt. Furthermore, a variable can be used to track the performance of the signal over a period of time 5004b, e.g., by providing an averaged signal strength over a period of time. Step 5004 can be implemented by channel estimator function 244 which itself can be implemented in firmware/software block 310 of FIG. 3. Following step 5004, flowchart 5000 proceeds to step 5006.

In step 5006 of the present embodiment, the multipath versions of the signal, which have each gone through the previous steps, are combined to form a composite signal. Step 5006 can be implemented by combiner function block 246 of FIG. 2A, which itself can be implemented by firmware/software block 310 of FIG. 3. Following step 5006, flowchart 5000 proceeds to step 5008.

In step 5008 of the present embodiment, a location of bits is chosen for the soft symbol. The soft symbol is a consecutive six bit sequence from the composite signal that can be evaluated by a decoder. The location of bits desired can be isolated from the composite signal by a number of methods, such as using a scaling function or by reformatting the signal. Step 5008 can be implemented using bit selection function 250 of FIGS. 2A and 2B. However, the present invention is well suited to using a wide variety of methods to choose a desired location of bits for the soft symbol depending upon the performance of the individual multipath signals and/or the composite signal. Following step 5008, flowchart 5000 proceeds to step 5010.

In step 5010 of the present embodiment, the performance the signal, and the respective location of bits chosen for the soft symbol, are adaptively updated. Step 5010 can be implemented according to a timing schedule that is appropriate for a given device. For example, the adaptive updating can be performed based on the system cycle, or some other similar criteria. In one embodiment, the updating is performed on non-continuous signal values, e.g., one signal sample for every 125 millisecond cycle. In another embodiment, a given location of bits is set as the default value, either for initial system operation or for a consistent performance history. Thereafter, the location of bits can be changed for a changing environment, e.g., when the performance of the signal changes beyond a threshold. Alternatively, the present invention is well suited to a wide variety of management techniques for deciding when and how the bit location should be changed.

Table 1, presented below, provides FER simulation results using the bit selection process of the present invention. Specifically, the HDS attributes define the real and fractional portion of the composite signal used for the Viterbi decoder. The scaling indicates how the composite signal was scaled down from its initial 24 bit length. The Floating and TR45 columns represent the floating point conversion of the number. Finally, the row above the cases, in the left-most column, indicate the K value of the signal, e.g., 1.2 K is a 1200 cycle system. The cases for different signal reception patterns is indicated below the system cycle case. For example, 1 finger fading has a 9.6 dB signal to noise ratio, Eb/Nt. This is a moderate case of fading. The percentage values listed under each of the columns indicates the effectiveness of the bit selection process. Overall, this table shows the effectiveness of choosing a different location of bits for the decoding operation.

environments, which can be significant for mobile communication devices. Thereby, the present invention provides the best soft symbol portion of the composite signal for subsequent demodulation. This bit selection process provides very little head room. Furthermore, it saturates large signal amplitudes. The process is viable because, at large amplitudes, the signal is unlikely to be decoded incorrectly, and thus does not require much resolution at these signal amplitudes. This scheme forces higher resolution in the area around the origin, and saturates large signal amplitudes.

While flowchart 5000 of the present embodiment shows a specific sequence and quantity of steps, the present invention is suitable to alternative embodiments. For example, not all the steps provided for flowchart 5000 are required for the present invention. And additional steps may be added to those presented. In particular, flowchart 5000 utilizes a composite test to establish a level of confidence.

Likewise, the sequence of the steps can be modified depending upon the application. Furthermore, while flowchart 5000 is shown as a single serial process, it can also be implemented as a continuous or parallel process. For example, it is appreciated that flowchart 5000 can be repeated for sequential signal values, either continuously or intermittently.

Many of the instructions for the steps, and the data input and output from the steps, of flowchart 5000 utilize memory 316 and utilize processor 314 and/or processor 317. The memory storage for the present embodiment can either be permanent, such as read only memory (ROM), or temporary memory such as random access memory (RAM). Memory 316 can also be any other type of memory storage, capable of containing program instructions, such as a hard drive, a CD ROM, or flash memory. Alternatively, the instructions may be implemented using some form of a state machine.

In view of the embodiments presented herein, the present invention effectively provides a method and apparatus for improving the capacity, fidelity, and performance of digital

TABLE 1

| HDS attributes | <16,8,t> | <16,7,t> | <16,6,t> | <16,5,t> | Floating | TR45 |
|---|---|---|---|---|---|---|
| Scaling | 1 | 0.5 | 0.25 | 0.125 | — | — |
| 1.2K | | | | | | |
| 1 Finger (9.6 dB) | — | 1.340% | 1.260% | — | 0.980% | 3.000% |
| 1 Finger (13.1 dB) | — | 0.614% | 0.568% | — | | 3.000% |
| 2 Finger (4.2 dB) | — | 0.700% | 0.500% | 1.000% | 0.010% | 3.000% |
| 2 Finger (6.8 dB) | — | 0.300% | 0.400% | 0.600% | 0.410% | 0.500% |
| 4.8K | | | | | | |
| 1 Finger (13.68 dB | — | 0.445% | 0.495% | 0.510% | 0.530% | 0.600% |
| 1 Finger (7.68 dB) | — | 8.182% | 8.082% | 8.262% | 6.821% | 7.300% |
| 9.6 | | | | | | |
| 2 Finger (7.6 dB) | — | 0.150% | 0.170% | 0.700% | 0.325% | 0.500% |
| 2 Finger (5.1 dB) | — | 2.900% | 3.200% | 4.000% | n/a | 2.500% |
| 1.8K | | | | | | |
| 1 Finger (2.1 dB) | — | 2.351% | 2.301% | 2.952% | n/a | n/a |
| 1 Finger (0.1 dB) | — | 20.46% | 20.46% | 21.96% | n/a | n/a |
| 14.4K | | | | | | |
| 1 Finger (7.1 dB) | 0.450% | 0.500% | 0.750% | 1.601% | n/a | 2.000% |
| 1 Finger (3.1 dB) | 50.47% | 56.62% | 51.37% | 68.58% | n/a | 30.00% |

By adaptively updating the bits chosen for the soft symbol, the present invention provides a communication device with greater flexibility. This flexibility allows the communication device to accommodate changing communication. More specifically, the present invention provides a method and apparatus for appropriately evaluating received signals for processing into meaningful data, e.g., voice data. Finally, as implemented in the present description, the present invention provides a method that overcomes the prior art limitations of selecting a portion of the combined signal for decoding. This consequently improves the quality of the signal and the flexibility of the communication device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a communication device, a method of providing a portion of a signal for a subsequent operation, said method comprising the steps of:
    a) receiving said signal at said communication device;
    b) demodulating said signal;
    c) determining a strength level of said signal, wherein said steps a) through c) are performed for each of a plurality of multipath signals:
    d) choosing a location of bits of said signal for said subsequent operation based upon said strength level of said signal,
    e) combining each of said plurality of multipath signals to form a composite signal; and
    f) choosing a location of bits of said composite signal for said decoding operation based upon said strength level of said signal for each of said plurality of multipath signals, wherein choosing a location of bits, father comprises the steps of:
        f1) determining an average bit location of said composite signal that is appropriate for its signal-to-noise ratio; and
        f2) multiplying said composite signal by a scale factor to scale said composite signal around said average bit location.

2. The method recited in claim 1 wherein said location of bits of said composite signal is chosen depending upon a reception scenario of each of said multipath signals.

3. The method recited in claim 1 wherein said location of bits comprises six consecutive binary digits of said signal.

4. The method recited in claim 1 wherein said communication device is a code division multiple access (CDMA) configured cellular phone.

5. A communication device for implementing a method of providing a portion of a signal for a subsequent operation, said method comprising the steps of:
    a) receiving said signal at said communication device, wherein said steps a) through c) are performed for each of a plurality of multipath signals;
    b) demodulating said signal;
    c) determining a strength level of said signal; and
    d) choosing a location of bits of said signal for said subsequent operation based upon said strength level of said signal;
    e) combining each of said plurality of multipath signals to form a composite signal; and
    f) choosing a location of bits of said composite signal for said decoding operation based upon said strength level of said signal for each of said plurality of multipath signals, wherein, choosing a location of bits, further comprises the steps of:
        f1) determining an average bit location of said composite signal that is appropriate for its signal-to-noise ratio; and
        f2) multiplying said composite signal by a scale factor to scale said composite signal around said average bit location.

6. The communication device recited in claim 5 wherein said subsequent operation is a decoding operation.

7. The communication device recited in claim 5 wherein said strength level is a signal-to-noise ratio (SNR).

8. The communication device recited in claim 5 wherein said location of bits chosen is adaptively updated.

9. The communication device recited in claim 5 wherein said location of bits of said composite signal is chosen depending upon a reception scenario of each of said multipath signals.

10. The communication device recited in claim 5 wherein said location of bits comprises six consecutive binary digits of said signal.

11. The communication device recited in claim 5 wherein said communication device is a code division multiple access (CDMA) configured cellular phone.

12. The communication device recited in claim 5 wherein said communication device comprises:
    a receiver, said receiver adapted to receive said signal;
    a processor, said processor coupled to said receiver; and
    a computer readable memory units, said computer readable memory unit coupled to said processor, said computer readable memory unit containing program instructions stored therein that execute, via said processor, said method of providing a portion of a signal for a decoding operation.

13. A computer readable medium containing therein computer readable codes for causing a communication device to implement a method of providing a portion of a signal for a subsequent operation, said method comprising the steps of:
    a) receiving said signal at said communication device, wherein said steps a) through c) are performed for each of a plurality of multipath signals;
    b) demodulating said signals
    c) determining a strength level of said signal; and
    d) choosing a location of bits of said signal for said subsequent operation based upon said strength level of said signal;
    e) combining each of said plurality of multipath signals to form a composite signal; and
    f) choosing location of bits of said composite signal for said decoding operation based upon said strength level of said signal for each of said plurality of multipath signals wherein said step f), choosing a location of bits, further comprises the steps of:
        f1) determining an average bit location of said composite signal that is appropriate for its signal-to-noise ratio; and
        f2) multiplying said composite signal by a scale factor to scale said composite signal around said average bit location.

14. The computer readable medium recited in claim 13 wherein said subsequent operation is a decoding operation.

15. The computer readable medium recited in claim 13 wherein said strength level is a signal-to-noise ratio(SNR).

16. The communication device recited in claim 13 wherein said location of bits chosen is adaptively updated.

17. The communication device recited in claim 13 wherein said location of bits of said composite signal is chosen depending upon a reception scenario of each of said multipath signals.

18. The communication device recited in claim 13 wherein said location of bits comprises six consecutive binary digits of said signal.

19. The communication device recited in claim 13 wherein said communication device is a code division multiple access (CDMA) configured cellular phone.

* * * * *